United States Patent [19]

Jetzer

[11] 3,951,731
[45] Apr. 20, 1976

[54] PROCESS FOR AEROBIC DECOMPOSITION AND SOLVENT TREATMENT OF WASTE MATERIAL

[75] Inventor: Raimund Jetzer, Nussbaumen, Switzerland

[73] Assignee: Jetzer Engineering AG, Vaduz, Liechtenstein

[22] Filed: Nov. 29, 1973

[21] Appl. No.: 420,288

[30] Foreign Application Priority Data

Dec. 4, 1972 Switzerland.................... 17607/72

[52] U.S. Cl. .................................. 162/5; 162/6; 162/51; 162/74; 162/77
[51] Int. Cl.² .......................................... D21C 5/02
[58] Field of Search .............. 162/4, 5, 6, 51, 55, 162/57, 72, 74, 77, 243; 241/15, 16, 17, 24, 28

[56] References Cited
UNITED STATES PATENTS

| | | | |
|---|---|---|---|
| 2,077,059 | 4/1937 | Snyder et al. ................. | 162/77 X |
| 2,166,540 | 7/1939 | Bailey ........................... | 162/77 X |
| 2,709,133 | 5/1955 | Meuly et al. .................. | 162/77 X |
| 3,253,976 | 5/1966 | Bocci ............................ | 162/5 |
| 3,595,741 | 7/1971 | Goss ............................. | 162/5 |
| 3,597,308 | 8/1971 | Brooks .......................... | 162/4 |
| 3,736,223 | 5/1973 | Marsh ........................... | 162/4 |
| 3,849,246 | 11/1974 | Raymond et al. ............. | 162/4 |

*Primary Examiner*—S. Leon Bashore
*Assistant Examiner*—Richard V. Fisher
*Attorney, Agent, or Firm*—Michael J. Striker

[57] ABSTRACT

In a process for the production of fiber substances from waste which contains aerobically unstable components, the waste is subjected to aerobic decomposition at a temperature of at least 50°C in the presence of oxygen to form a fibrous mass and then the mass is treated with solvents which dissolve these components. This eliminates the odor characteristic of fiber substances produced from waste. An arrangement for carrying out the process is also disclosed.

15 Claims, 1 Drawing Figure

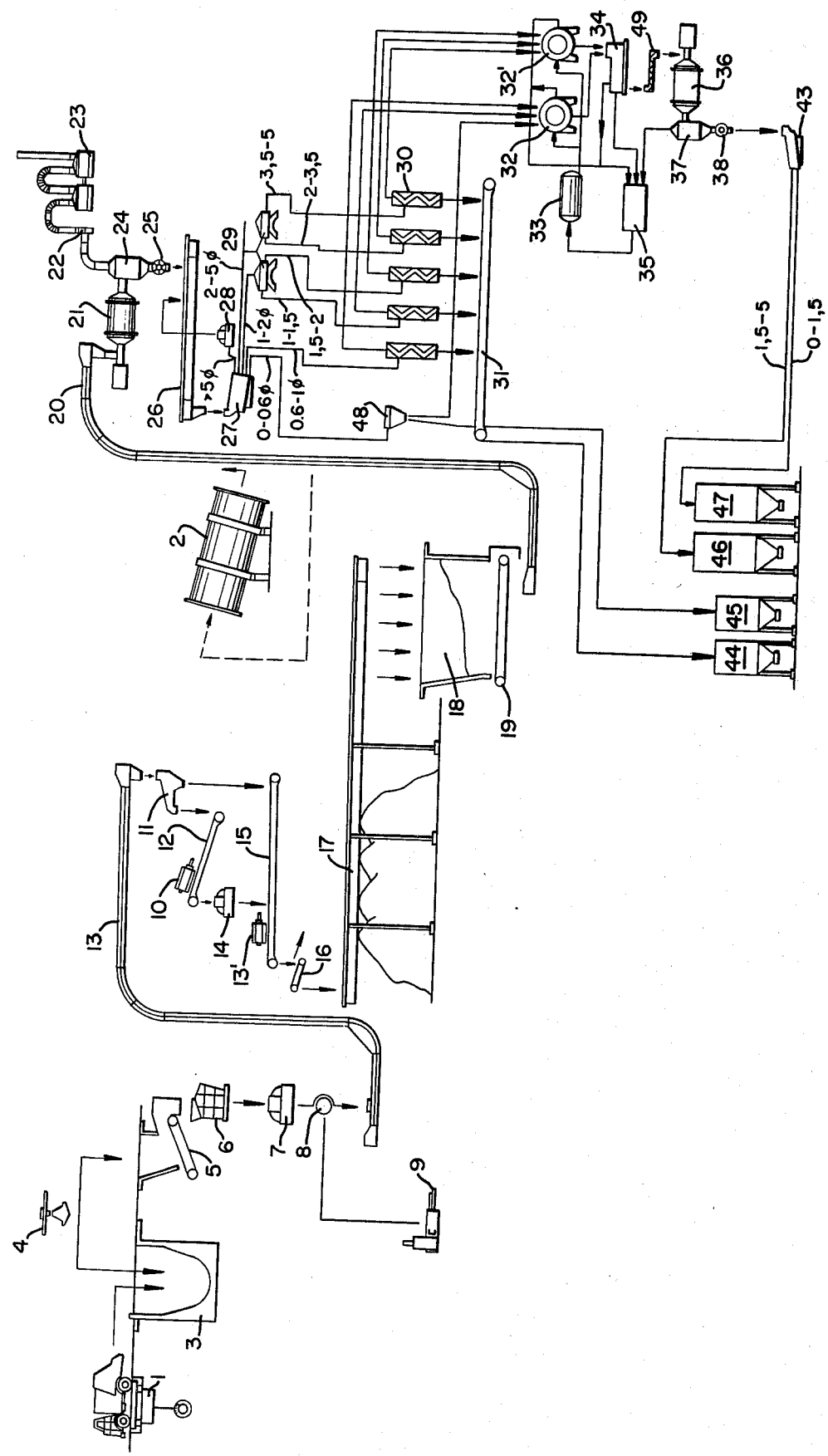

PROCESS FOR AEROBIC DECOMPOSITION AND SOLVENT TREATMENT OF WASTE MATERIAL

BACKGROUND OF THE INVENTION

The invention relates generally to the treatment of waste products. More particularly, the invention relates to a process and arrangement for the production of fiber substances from waste products such as household waste, agricultural waste, forestry waste and/or organic industrial or commercial waste.

The term "waste" or "waste product" used herein is intended to encompass refuse, rubbish, trash, garbage, debris and the like.

Household waste, agricultural waste, forestry waste and/or organic industrial or commercial waste are normally composed of components which decompose readily under aerobic conditions, other components which are semistable under aerobic conditions and still other components which are difficult to decompose aerobically. Waste of this type accumulated in municipalities is, in known manner, disposed of in incinerating or composting apparatus. It is also known to convert such waste into a biochemically stable fiber substance or into a fiber granulate by means of an aerobic decaying or rotting process followed by sterilization and drying. This is disclosed, for example, in the Swiss Pat. No. 503,576 and in the U.S. patent application Ser. No. 327,234.

During such aerobic degradation or decomposition processes, those substances such as sugar, proteins, starch, fat etc. which readily decompose under aerobic conditions are decomposed almost entirely whereas substances such as cellulose and lignin which, respectively, are semi-stable or difficult to decompose under aerobic conditions are partly or predominantly retained. These semi-stable and difficult to decompose substances may, in the same manner as wood, be considered as biochemically stable, that is, under normal atmospheric conditions, no further degradation by decay or aerobic decomposition is to be expected.

The fiber substance or fiber granulate obtained by the aerobic decomposition is particularly well adapted for mixing with a binder and subsequent pressing or molding into structural panels such as insulating panels, dividing walls, panels for use in furniture etc. However, the fiber substances or fiber granulates obtained by the known processes have the disadvantage that they possess an inherent acidic odor. This is due to the fact that those components of the waste which readily undergo aerobic decomposition are not entirely eliminated during the conversion of the waste into the fiber substance or fiber granulate so that these decompose subsequently thereby giving rise to an odor.

SUMMARY OF THE INVENTION

It is, accordingly, a general object of the invention to provide a novel process and arrangement for the conversion of waste into fibers.

More particularly, it is an object of the invention to provide a process and arrangement whereby biochemically stable, odorless fibers may be produced from household waste, agricultural waste, forestry waste and/or organic industrial or commercial waste.

Another object of the invention is to provide a process and arrangement whereby biochemically stable, odorless fibers may be produced from waste in a simple and economical manner.

In pursuance of the above objects, and of others which will become apparent hereinafter, the invention provides, in a process for the production of fibers from waste which contains aerobically unstable components, for contacting the waste with at least one solvent capable of dissolving at least part of these components. This results in a minimization of the odor of the resulting fibers. A novel arrangement for the production of fibers from waste which contains aerobically unstable components comprises means for effecting dissolution of at least part of these components in a solvent. The waste may be dried subsequent to being contacted with the solvent.

The invention has the surprising advantage that the waste need not, as was necessary heretofore, be subjected to aerobic decay. This has the consequence that the installations and arrangements for aerobic decay which were required for the prior art processes may be dispensed with when using the invention.

A further advantage of the invention resides in the fact that the known fiber substances or fiber granulates obtained by aerobic decomposition may subsequently be subjected to a treatment in accordance with the invention in order to free them from their inherent odor. As a result, where installations and arrangements for the aerobic decay of waste are already in existence, these may very suitably be incorporated for use in the process and arrangement of the invention.

It will be appreciated that the invention makes use of the solubility of aerobically unstable components in suitable solvents. This is in contrast to the prior art processes where dissolution does not occur but where actual decay or degradation occurs.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE schematically illustrates an arrangement for carrying out the process according to the invention.

DESCRIPTION OF THE PREFERRED EMBODIMENTS

Household waste, agricultural waste, forestry waste and/or organic industrial and commercial waste (hereinafter referred to as waste) is accumulated by means of a suitable vehicle and loaded onto an appropriate vehicle such as a garbage truck. This waste includes components such as starch, protein, sugar, fat etc. which readily decompose aerobically (hereinafter referred to as unstable or aerobically unstable components). The waste also includes components such as cellulose which do not aerobically decompose as readily as the unstable components (hereinafter referred to as semi-stable or aerobically semi-stable components) as well as other components such as lignin which are difficult to decompose aerobically (hereinafter referred to as stable or aerobically stable components). It will be understood that overlap exists between the "unstable" and "semi-stable" categories and between the "semi-stable" and "stable" categories and these terms are to be interpreted with this in mind.

Waste of the type under discussion normally is constituted as follows: 4–5% glass, 0.2–0.5% non-ferrous metals, 3–5% iron, 0.501% bones and bread, 2–3% cloth scraps and other textiles, 2–3% synthetic resins, plastic, leather and wood, generally 15% kitchen waste, 15% garden waste, agricultural waste and forestry waste, and 65% papers and packing materials.

Referring now to the FIGURE, the waste-laden vehicle is first weighed on a vehicle scale 1. Thereafter, it dumps the waste into a raw waste silo 3. If the waste is particularly bulky, it may first be passed through a non-illustrated shear for bulky waste. The waste is conveyed from the silo 3 to a dosing or metering belt 5 via a grab bucket 4. The waste falls from the dosing belt 5 into an impact pulverizer 6 where it undergoes a coarse pulverization and subsequently passes into a second impact pulverizer 7 for further pulverization. Upon leaving the second impact pulverizer 7, the waste passes by a magnetic separator 8 and is conveyed to a vibrating sieve 11 by means of a bucket chain conveyor 13. The metallic bits and pieces separated from the waste by the magnetic separator 8 are passed into a baling or packing press 9.

That portion of the waste which passes through the sieve 11 travels to a belt conveyor 15. On the other hand, that portion of the waste which has not been able to pass through the sieve 11 is thrown onto or placed on a belt conveyor 12 which conveys it past a second magnetic separator 10 and into a third impact pulverizer 14. After passing through the impact pulverizer 14, this portion of the waste travels to the belt conveyer 15. The conveyor 15 conveys the waste past a fourth magnetic separator 13', the waste next being thrown or passed onto a bounce band or belt 16 for the separation of hard substances. The waste, which has now been freed from hard substances, is then passed over to a bucket or drag chain conveyor 17 from which it is thrown into an intermediate silo 18. The waste loaded into the silo 18 is removed therefrom via a transfer plate or belt conveyor 19 and passed over to a bucket or drain chain conveyor 20. The conveyor 20 conveys the pulverized or comminuted waste to a drying drum 21 either directly or via a fermentation drum 2. Fermentation drums or vessels are conventional products and are produced, for example, by Rheinstahl AG of Essen, Germany or DANU of Copenhagen, Denmark. In the illustrated embodiment, the drying drum 21 is a rotating, cylindrical drum having opposite axial ends into one of which the combustion gases of an oil burner are forced or blown in axial direction of the drum and through the other of which the gases are withdrawn or sucked out, also in axial direction of the drum.

In the event that the waste is passed through the fermentation drum 2, it is retained therein for a period of one to four days at a temperature of about 50° C during which period the fermentation drum 2 is continuously rotated. As a result of this treatment, the water content of the waste becomes adjusted at a value of approximately 40%. During the treatment in the fermentation drum 2, the unstable components are aerobically decomposed to a great degree and the semi-stable components are also partially decomposed aerobically. The product leaving the fermentation drum 2 is referred to as compost.

In the drying drum 21, the waste or compost (the terminology used depending upon whether the waste has or has not previously been passed through the fermentation drum 2) is heated to a temperature in excess of about 100° C and dried, this being accompanied by a sterilization. The dried waste issuing from the drum 21 is referred to as dry waste whereas the dried and sterilized compost issuing from the drum 21 is referred to as fibers. For simplicities sake, however, both of these products will be referred to in the following simply as "waste".

The waste is withdrawn from or sucked out of the drum 21 into a cyclone 24 by means of the exhaust gases of the burners for the drum 21. In the cyclone 24, the exhaust gases are separated from the waste in that the exhaust gases flow upwardly under the influence of a blower 22 and are conveyed into an exhaust gas washer 23. The waste leaves the cyclone 24 via a rotary gate valve 25 and passes onto a bucket or drag chain conveyor 26 which conveys the waste to a four-stage sieve 27. The waste is divided into five fractions in the sieve 27. The waste is divided into five fractions in the sieve 27. The coarsest fraction consists of particles having a diameter greater than about 5 millimeters. The next finest fraction consists of particles having a diameter between about 2 and 5 millimeters whereas the following fraction consists of particles with a diameter between about 1 and 2 millimeters. The diameters of the particles in the subsequent two fractions are between about 0.6 and 1 millimeters and between 0 and about 0.6 millimeters, respectively.

The coarsest fraction, that is, the fraction consisting of particles with a diameter of more than 5 millimeters, is conveyed into a mill or crusher 28 and pulverized. After the pulverization, this fraction is again brought onto the conveyor 26 and returned thereby into the four-stage sieve 27.

The finest fraction or, in other words, the fraction consisting of particles having a diameter between 0 and 0.6 millimeters, is conveyed into a cyclone 48 in order to separate therefrom any fine sand which might be present, the thus-separated sand being forwarded into a storage bin 45. This fraction, which is now freed of fine sand, then passes into a dissolving or washing apparatus 32.

The remaining fractions, that is, the fractions consisting of particles having diameters between 0.6 and 5 millimeters, are passed through air separators or sifters 30 wherein the heavy particles are separated. Before entering the air separators 30, the fractions consisting of particles having a diameter between 1 and 2 millimeters and between 2 and 5 millimeters, respectively, pass through a sieve 29 wherein they are again divided, this time into fractions of different lengths. The division of the waste into differing fractions is undertaken for the reason that a better separation of the heavy particles during the air separation is obtained when the lengths of the fibers are uniform than when the fibers are of different lengths. The heavy particles separated from the waste in the air separators 30 are conveyed to a heavy particle storage bin 44 by means of a belt conveyor 31.

The waste fractions consisting of particles having a diameter between 0.6 and 1.5 millimeters are conveyed from the respective air separators 30 into the dissolving apparatus 32 whereas the waste fractions consisting of particles having a diameter between 1.5 and 5 millimeters are conveyed into another dissolving or washing apparatus 32'. In the dissolving apparatus 32, 32', the waste is contacted or washed with a solvent. Advantageously, this is carried out at an elevated temperature. It is also advantageous when an emulsifier is added to the solvent.

Suitable solvents include water, alcohol and degreasing agents or fat solvents. Examples of alcohols which may be used for this purpose are ethyl alcohol, isopropyl alcohol, methanol and butanol. Examples of suitable degreasing agents are hexane; benzene; aromatic hydrocarbons such as benzene, xylene and toluene; and chlorinated hydrocarbons such as methylene chloride, chloroform, carbon tetrachloride etc. Surfactants such as polyglycol ether and anionic sulfonates are particularly suitable for use as emulsifiers.

The waste forms a mixture in the dissolving apparatus 32, 32' and the unstable components such as starch, protein, sugar, fat etc. present or still remaining in the waste (the terminology used being dependent upon whether the waste has or has not been treated in the fermentation drum 2) are dissolved out or washed out of the waste in the dissolving apparatus 32, 32'. Subsequent to the dissolution process, the waste, that is, the mixture formed thereby, is passed into a centrifuge 34 wherein the impure solvent is separated from the waste residue. The impure solvent or washing agent is regenerated in a distillation apparatus 35 and then forwarded to a solvent container 33 from which it is pumped into the dissolving apparatus 32 and 32' as the need arises. The waste residue is conveyed via a screw conveyor 49 into a drying drum 36 and, depending upon the particular solvent used, is heated therein to a temperature between about 60° and 140° C. The solvent vapors generated in the drying drum 36 are forwarded to the distillation apparatus 35. The dried waste residue issuing from the drying drum 36 is in the form of gray-brown, odorless and sterile fibers. These are passed into a cyclone 37 and travel from there through a rotary gate valve 38 to a two-stage sieve 43. The waste gases from the drying drum 36 are separated in the cyclone 37 and passed to the distillation apparatus. In the two-stage sieve 43, the dried fibers are divided into fractions consisting of fibers having a diameter between about 0 and 1.5 millimeters and between about 1.5 and 5 millimeters, respectively. The two fractions are then conveyed into the respective silos 46 and 47.

The fibers obtained in this manner may be mixed with a binder such as, for example, urea formaldehyde resin or phenol resin. The fibers may, as can also be seen from the Swiss Pat. No. 503,576, be worked into the form of panels, pressed boards and the like. However, they may also find application as an insulating material, a filler material or the like.

The following experimental Examples are based on practical tests which were carried out in accordance with the general procedure outlined above.

EXAMPLE 1

Household, garden, industrial and commercial waste, which had been placed at the curb in readiness for the municipal waste removal, was collected and subjected to the treatment outlined above with reference to the drawing. In this instance, the treatment in the fermentation drum 2 was omitted. 175 parts by weight of the waste issuing from the air separators 30 was stirred into 390 parts by weight of ethanol in each of the dissolving apparatus 32 and 32'. The dissolving apparatus 32 and 32' were cylindrical vessels provided with a bladed stirrer. The wash solution or solvent was retained in the dissolving apparatus 32, 32' at a temperature of 20° C without agitation for a period of 30 days. Thereafter, the wash solution was separated from the waste in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 2

Household, garden, industrial and commercial waste, which had been placed at the curb in readiness for the municipal waste removal, was collected and subjected to the treatment outlined above with reference to the drawing. In this instance, the treatment in the fermentation drum 2 was omitted. 160 parts by weight of the waste issuing from the air separators 30 was stirred into 600 parts by weight of chloroform in each of the dissolving apparatus 32 and 32'. The dissolving apparatus 32, 32' were cylindrical vessels provided with a bladed stirrer. The wash solution or solvent was retained in the dissolving apparatus 32, 32' at a temperature of 20° C without agitation for a period of 30 days. Thereafter, the wash solution was separated from the waste in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 3

Household, garden, industrial and commercial waste, which had been placed at the curb in readiness for the municipal waste removal, was collected and subjected to the treatment outlined above with reference to the drawing. In this instance, the treatment in the fermentation drum 2 was omitted. 264 parts by weight of the waste issuing from the air separators 30 was charged into 216 parts by weight of isopropyl alcohol in each of the dissolving apparatus 32 and 32'. The dissolving apparatus 32, 32' were extraction apparatus after Soxhlet, that is, Soxhlet apparatus. The Soxhelt principle makes possible an intensive reaction by the continuous introduction of new, pure solvent. The treatment in the dissolving apparatus 32, 32' lasted for 3 hours. Thereafter, the wash solution or solvent was separated from the waste in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 4

Household, garden, industrial and commercial waste, which had been placed at the curb in readiness for the municipal waste removal, was collected and subjected to the treatment outlined above with reference to the drawing. In this instance, the treatment in the fermentation drum 2 was omitted. 41.3 parts by weight of the waste issuing from the air separators 30 was charged into 290 parts by weight of fuel alcohol in each of the dissolving apparatus 32 and 32'. The dissolving apparatus 32, 32' were extraction apparatus after Soxhlet. The Soxhlet principle makes possible an intensive reaction by the continuous influx of new, pure solvent. The treatment in the dissolving apparatus 32, 32' lasted for 5 hours. Thereafter, the wash solution or solvent was separated from the waste in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 5

Household, garden, industrial and commercial waste, which had been placed at the curb in readiness for the municipal waste removal, was collected and subjected to the treatment outlined above with reference to the drawing. In this instance, the treatment in the fermentation drum 2 was omitted. 36 parts by weight of the waste issuing from the air separators 30 was stirred into 222 parts by weight of xylol in each of the dissolving apparatus 32 and 32'. The dissolving apparatus 32, 32' were cylindrical vessels provided with a bladed stirrer. The wash solution or solvent was boiled in the dissolving apparatus 32, 32' at a temperature of 137°–140° C for a period of 3½ hours. The vaporized xylol was continuously replaced from the solvent container 33. Subsequently, the wash solution was separated from the waste in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 6

Household, garden, industrial and commercial waste, which had been placed at the curb in readiness for the municipal waste removal, was collected and subjected to the treatment outlined above with reference to the drawing. In this instance, the treatment in the fermentation drum 2 was omitted. 20 parts by weight of the waste issuing from the air separators 30 was stirred into 155 parts by weight of ethyl alcohol in each of the dissolving apparatus 32 and 32'. The dissolving apparatus 32, 32' were cylindrical vessels provided with a bladed stirrer. The wash solution or solvent was retained in the dissolving apparatus 32, 32' at a temperature of 20° C without agitation for a period of 4 days. The ethyl alcohol was mixed with 1.6 parts by weight of an emulsifier. The emulsifier used was that commercially available under the trademark "Emulsogen J40" which is produced by Farbwerke Hoechst AG of Frankfurt am Main, Germany. This emulsifier includes a combination of an unionized compound with an anionic compound. Subsequent to the treatment in the dissolving apparatus 32, 32', the wash solution was separated from the waste in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 7

Household, garden, industrial and commercial waste, which had been placed at the curb in readiness for the municipal waste removal, was collected and subjected to the treatment outlined above with reference to the drawing. In this instance, the treatment in the fermentation drum 2 was omitted. 15 parts by weight of the waste issuing from the air separators 30 was stirred into 155 parts by weight of isopropyl alcohol in each of the dissolving apparatus 32 and 32'. The dissolving apparatus were cylindrical vessels provided with a bladed stirrer. The wash solution or solvent was retained in the dissolving apparatus 32, 32' at a temperature of 20° C without agitation for a period of 4 days. The isopropyl alcohol was mixed with 1.2 parts by weight of unionized fatty acid polyglycol ester which latter served as an emulsifier. This emulsifier is commercially available under the trademark "Emulsogen EL" and is produced by Farbwerke Hoechst AG of Frankfurt am Main, Germany. Subsequent to the treatment in the dissolving apparauts 32, 32' the wash solution was separated from the waste in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 8

Household, garden, industrial and commercial waste, which had been placed at the curb in readiness for the municipal waste removal, was collected and subjected to the treatment outlined above with reference to the drawing. In this instance, the treatment in the fermentation drum 2 was omitted. 80 parts by weight of the waste issuing from the air separators 30 was stirred into 1200 parts by weight of water in each of the dissolving apparatus 32 and 32'. The dissolving apparatus 32, 32' were cylindrical vessels provided with a bladed stirrer. The wash solution or solvent was stirred in the dissolving apparatus 32, 32' at a temperature of 20°–60° C for a period of 3½ hours. The water was mixed with 7.2 parts by weight of unionized fatty acid polyglycol ester which latter served as a surfactant. This surfactant is commercially available under the trademark "Emulsogen EL" and is a product of Farbwerke Hoechst AG of Frankfurt am Main, Germany. Subsequent to the treatment in the dissolving apparatus 32, 32', the wash solution was separated from the waste in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 9

Household, garden, industrial and commercial waste, which had been placed at the curb in readiness for the municipal waste removal, was collected and subjected to the treatment outlined above with reference to the drawing. In this instance, the treatment in the fermentation drum 2 was omitted. 80 parts by weight of the waste issuing from the air separators 30 was stirred into 1200 parts by weight of water in each of the dissolving apparatus 32 and 32'. The dissolving apparatus 32, 32' were cylindrical vessels provided with a bladed stirrer. The wash solution or solvent was stirred in the dissolving apparatus 32, 32' at a temperature of 20°–60° C for a period of 3½ hours. The water was mixed with 7.2 parts by weight of unionized fatty acid polyglycol ester which latter served as a surfactant. This surfactant is commercially available under the trademark "Emulsogen EL" and is a product of Farbwerke Hoechst AG of Frankfurt am Main, Germany. Subsequent to the treatment in the dissolving apparatus 32, 32', the wash solution was separated from the waste in the centrifuge 34 and the residue dried in the drying drum 36 at a temperature of 140°–160° C. The material issuing from the rotary gate valve 38 was in the form of gray fibers. However, in departure from the process described above with reference to the drawing, the fibers issuing from the rotary gate valve 38 were divided into two groups and each group returned to one of the dissolving apparatus 32 and 32' where the respective groups of fibers where charged into 270 parts by weight of benzol. The dissolving apparatus 32, 32' now used were extraction apparatus after Soxhlet. The treatment in the dissolving apparatus 32, 32' lasted 4 hours. Thereafter, the wash solution was separated from the fibers in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 10

Household, garden, industrial and commercial waste, which had been placed at the curb in readiness for the municipal waste removal, was collected and subjected to the treatment outlined above with reference to the drawing. In this instance, the waste was treated in the fermentation drum 2. However, the drying and fractionation occurring at 21 to 30 in the drawing were omitted. Thus, 250 parts by weight of the compost issuing from the fermentation drum 2 was stirred into 1500 parts by weight of water in each of the dissolving apparatus 32 and 32'. The dissolving apparatus 32, 32' were cylindrical vessels provided with a bladed stirrer. The wash solution or solvent was constantly stirred in the dissolving apparatus 32, 32' at a temperature of 75° C for a period of 15 minutes. The water was mixed with 2 parts by weight of polyglycol ether condensate which latter served as a surfactant. This surfactant is an unionized condensation product of ethylene oxide on alkyl phenol, is commercially available under the trademark "Tensophene H.10" and is a product of Tensia S.A. of Liege. Subsequent to the treatment in the dissolving apparatus 32, 32', the wash solution was separated from the compost in the centrifuge 34 and the residue dried in the drying drum 36 at a temperature of 140°–160° C. The material issuing from the rotary gate valve 38 was in the form of dry, odorless fibers. A sterilization test showed that the fibers were sterile.

EXAMPLE 11

Household, garden, industrial and commercial waste, which had been placed at the curb in readiness for municipal waste removal, was collected and subjected to the treatment outlined above with reference to the drawing. In this instance, the waste was treated in the fermentation drum 2. However, the drying and fractionation occurring at 21 to 30 in the drawing were omitted. Thus, 5000 parts by weight of the compost issuing from the fermentation drum 2 was stirred into 1400 parts by weight of water in each of the dissolving apparatus 32 and 32'. The dissolving apparatus 32, 32' were cylindrical vessels provided with a bladed stirrer. The wash solution or solvent was stirred in the dissolving apparatus 32, 32' at a temperature of 90°–100° C for a period of 5 minutes. At the end of this period, the sludge was permitted to cool off to a temperature of 40° C in the dissolving apparatus 32, 32'. The water was mixed with 20 parts by weight of polyglycol ether condensate which latter served as a surfactant. This surfactant is an unionized condensation product of ethylene oxide on alkyl phenol, is commercially available under the trademark "Tensophene H.10" and is a product of Tensia S.A. of Liege. Subsequent to the treatment in the dissolving apparatus 32, 32', the wash solution was separated from the compost in the centrifuge 34 and the residue dried in the drying drum 36 at a temperature of 140°–160° C. The material issuing from the rotary gate valve 38 was in the form of dry, odorless fibers. A sterilization test showed the fibers to be sterile.

EXAMPLE 12

Household, garden, industrial and commercial waste, which had been placed at the curb in readiness for the municipal waste removal, was collected and subjected to the treatment outlined above with reference to the drawing. In this instance, the waste was treated in the fermentation drum 2. However, the drying and fractionation occurring at 21 to 30 in the drawing were omitted. Thus, 5000 parts by weight of the compost issuing from the fermentation drum 2 was stirred into 1400 parts by weight of water in each of the dissolving apparatus 32 and 32'. The dissolving apparatus 32, 32' were cylindrical vessels provided with a bladed stirrer. The wash solution or solvent was stirred in the dissolving apparatus 32, 32' at a temperature of 90°–100° C for a period of 10 minutes. The water was mixed with 5 parts by weight of polyglycol ether condensate which latter served as a surfactant. This surfactant is an unionized condensation product of ethylene oxide on alkyl phenol, is commercially available under the trademark "Tensophene H.10" and is a product of Tensia S.A. of Liege. Subsequent to the treatment in the dissolving apparatus 32, 32', the wash solution was separated from the compost in the centrifuge 34 and the residue dried in the drying drum 36 at a temperature of 140°–160° C. The material issuing from the rotary gate valve 38 was in the form of dry, odorless, gray fibers. A sterilization test showed the fibers to be sterile.

EXAMPLE 13

Household, garden, industrial and commercial waste, which has been placed at the curb in readiness for the municipal waste removal, was collected and subjected to the treatment outlined above with reference to the drawing. In this instance, the waste was treated in the fermentation drum 2. However, the drying and fractionation occurring at 21 to 30 in the drawing were omitted. Thus, 5000 parts by weight of the compost issuing from the fermentation drum 2 was stirred into 1400 parts by weight of water in each of the dissolving apparatus 32 and 32'. The dissolving apparatus 32, 32' were cylindrical vessels provided with a bladed stirrer. The wash solution or solvent was stirred in the dissolving apparatus 32, 32' at a temperature of 60°–70° C for a period of 5 minutes. The water was mixed with 15 parts by weight of alkoxylated primary alcohol which latter served as a surfactant. This surfactant is commercially available under the trademark "Syntens KMA 70-W-02" and is a product of Hefti AG of Zurich, Switzerland. Subsequent to the treatment in the dissolving apparatus 32, 32', the wash solution was separated from the compost in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 14

Household, garden, industrial and commercial waste, which had been placed at the curb in readiness for the municipal waste removal, was collected and subjected to the treatment outlined above with reference to the drawing. In this instance, the waste was treated in the fermentation drum 2. 3000 parts by weight of the compost issuing from the air separators 30 was stirred into 8000 parts by weight of water in each of the dissolving apparatus 32 and 32'. The dissolving apparatus 32, 32' were cylindrical vessels provided with a bladed stirrer. The wash solution or solvent was stirred in the dissolving apparatus 32, 32' at a temperature of 60°–100° C for a period of 30 minutes. The water was mixed with 10 parts by weight of unionized fatty alcohol polyglycol ether which latter served as a surfactant. This surfactant is commercially available under the trademark "Emulsogen MS 12" and is a product of Farbwerke Hoechst AG of Frankfurt am Main, Germany. Subsequent to the treatment in the dissolving apparatus 32, 32', the wash solution was separated from the compost in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 15

Household, garden, industrial and commercial waste, which had been placed at the curb in readiness for the municipal waste removal, was collected and subjected to the treatment outlined above with reference to the drawing. In this instance, the waste was treated in the fermentation drum 2. 390 parts by weight of the compost issuing from the air separators 30 was stirred into 1000 parts by weight of water in each of the dissolving apparatus 32 and 32'. The dissolving apparatus 32, 32' were cylindrical vessels provided with a bladed stirrer. The wash solution or solvent was stirred in the dissolving apparatus 32, 32' at a temperature of 30°–40° C for a period of 3½ hours. The water was mixed with 1 part by weight of a 57% solution of alkyl-arylsulfonate-triethanol salt which latter served as a surfactant. This surfactant is commercially available under the trademark "Tensarane SB.TE" and is a product of Tensochema AG of Zurich, Switzerland. Subsequent to the treatment in the dissolving apparatus 32, 32', the wash solution was separated from the compost in the centrifuge 34 and the residue dried in the drying drum 36 at a temperature of 140°–160° C. The material issuing from the rotary gate valve 38 was in the form of dry, odorless, gray fibers. A sterilization test showed the fibers to be sterile.

EXAMPLE 16

Household, garden, industrial and commercial waste, which had been placed at the curb in readiness for the municipal waste removal, was collected and subjected to the treatment outlined above with reference to the drawing. In this instance, the waste was treated in the fermentation drum 2. 520 parts by weight of the compost issuing from the air separators 30 was stirred into 1500 parts by weight of water in each of the dissolving apparatus 32 and 32'. The dissolving apparatus 32, 32' were cylindrical vessels provided with a bladed stirrer. The wash solution or solvent was retained in the dissolving apparatus 32, 32' at a temperature of 20° C without agitation for a period of 45 minutes. The water was mixed with 1.3 parts by weight of unionized alkyl-aryl-polyglycol ether which latter served as a surfactant. This surfactant is commercially available under the trademark "Emulsogen ELN" and is a product of Farbwerke Hoechst AG of Frankfurt am Main, Germany. Subsequent to the treatment in the dissolving apparatus 32, 32', the wash solution was separated from the compost in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

EXAMPLE 17

Household, garden, industrial and commercial waste, which had been placed at the curb in readiness for the municipal waste removal, was collected and subjected to the treatment outlined above with reference to the drawing. In this instance, the waste was treated in the fermentation drum 2. 200 parts by weight of the compost issuing from the air separators 30 was stirred into 1100 parts by weight of fuel alcohol. In departure from the process described with reference to the drawing, however, this was effected in the dissolving apparatus 32 only. The dissolving apparatus 32 was a cylindrical vessel provided with a bladed stirrer. The wash solution or solvent was retained in the dissolving apparatus 32 at a temperature of 20° C without agitation for a period of 12 hours. The fuel alcohol was mixed with 5 parts by weight of unionized fatty acid polyglycol ester which latter served as a surfactant. This surfactant is commercially available under the trademark "Emulsogen EL" and is produced by Farbwerke Hoechst AG of Frankfurt am Main, Germany. After the treatment in the dissolving apparatus 32, the suspension was transferred into the dissolving apparatus 32'. The dissolving apparatus 32' was an extraction apparatus after Soxhlet. The Soxhlet principle makes possible an intensive reaction by the continuous influx of new, pure solvent. The treatment in the dissolving apparatus 32' took place at a temperature of 80° C and lasted 9 hours. Thereafter, the wash solution was separated from the compost in the centrifuge 34 and the residue dried in the drying drum 36 at a temperature of 140°–160° C. The material issuing from the rotary gate valve 38 was in the form of dry, odorless, gray fibers. A sterilization test showed the fibers to be sterile.

EXAMPLE 18

Household, garden, industrial and commercial waste, which had been placed at the curb in readiness for the municipal waste removal, was collected and subjected to the treatment outlined above with reference to the drawing. 80 parts by weight of the compost issuing from the air separators 30 was stirred into 270 parts by weight of benzol. In departure from the process described with reference to the drawing, however, this was effected in the dissolving apparatus 32 only. The dissolving apparatus 32 was a cylindrical vessel provided with a bladed stirrer. The wash solution or solvent was retained in the dissolving apparatus 32 at a temperature of 20° C without agitation for a period of 12 hours. Subsequent to the treatment in the dissolving apparatus 32, the suspension was transferred into the dissolving apparatus 32'. The dissolving apparatus 32' was an extraction apparatus after Soxhlet. The Soxhlet principle makes possible an intensive reaction by the continuous introduction of new, pure solvent. The treatment in the dissolving apparatus 32' took place at a temperature of 83° C and lasted 9 hours. Thereafter, the wash solution was separated from the compost in the centrifuge 34 and the residue dried in the drying drum 36 at a temperature of 140°–160° C. The material issuing from the rotary gate valve 38 was in the form of dry, odorless, gray fibers. A sterilization test showed the fibers to be sterile.

EXAMPLE 19

Household, garden, industrial and commercial waste, which had been placed at the curb in readiness for the municipal waste removal, was collected and subjected to the treatment outlined above with reference to the drawing. In this instance, the waste was treated in the fermentation drum 2. 80 parts by weight of the compost issuing from the air separators 30 was stirred into 270 parts by weight of benzol. In departure from the process described with reference to the drawing, however, this was effected in the dissolving apparatus 32 only. The dissolving apparatus 32 was a cylindrical vessel provided with a bladed stirrer. The wash solution or solvent was retained in the dissolving apparatus 32 at a temperature of 20° C without agitation for a period of 12 hours. Subsequent to the treatment in the dissolving apparatus 32, the suspension was transferred into the dissolving apparatus 32'. The dissolving apparatus 32' was an extraction apparatus after Soxhlet. The Soxhlet principle makes possible an intensive reaction by the continuous influx of new, pure solvent. The treatment in the dissolving apparatus 32' took place at a temperature of 83° C and lasted 9 hours. Subsequent to this treatment, the impure benzol was replaced with pure benzol and the treatment at 83° C carried out for an additional 7 hours. Thereafter, the wash solution was separated from the compost in the centrifuge 34 and the residue dried in the drying drum 36 at a temperature of 140°–160° C. The material issuing from the rotary gate valve 38 was in the form of dry, odorless, gray fibers. A sterilization test showed that the fibers were sterile.

It is emphasized that the term "waste" has been used to denote the material being treated until that point in the process following the drying operation which is subsequent to the dissolution. This has been done for the sake of simplicity and is not intended to imply that the fibrous character may not become apparent before this point in the process.

It will be understood that each of the elements described above, or two or more together, may also find a useful application in other types of construction and uses differing from the types described above.

While the invention has been illustrated and described as embodied in a process and apparatus for the treatment of waste material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

1. A process for recovering fibrous materials from waste, comprising subjecting a quantity of waste which contains aerobically unstable components to aerobic decomposition by maintaining said waste at a temperature of at least about 50° C in the presence of oxygen until said aerobically unstable components are aerobically decomposed to a great extent and aerobically semi-stable components are also partially aerobically decomposed to thereby obtain a fibrous mass; contacting at least a portion of the mass with at least one solvent which is capable of dissolving the still undecomposed aerobically unstable components remaining in said mass so that said undecomposed aerobically unstable components are dissolved; and removing said solvent containing the dissolved undecomposed aerobically unstable components from said portion of said mass so as to recover a fibrous material the odor of which is reduced due to the aerobic decomposition and dissolution of said aerobically unstable components.

2. A process as defined in claim 1; and further comprising the step of comminuting said waste prior to the aerobic decomposition step.

3. A process as defined in claim 1; and further comprising the step of heating said portion to a temperature in excess of approximately 100° C prior to the contacting step.

4. A process as defined in claim 1, wherein said one solvent comprises water.

5. A process as defined in claim 1, wherein said one solvent comprises alcohol.

6. A process as defined in claim 1, wherein said one solvent comprises a degreasing agent.

7. A process as defined in claim 1, wherein said one solvent comprises an emulsifier.

8. A process as defined in claim 7, wherein said emulsifier comprises a surfactant.

9. A process as defined in claim 1, wherein said portion is contacted with an additional solvent subsequent to being contacted with said one solvent, said additional solvent being different from said one solvent.

10. A process as defined in claim 9, wherein one of said solvents comprises a degreasing agent, and the other of said solvents includes a substance selected from the group consisting of water and alcohol.

11. A process as defined in claim 10, wherein said other solvent comprises an emulsifier.

12. A process as defined in claim 11, wherein said emulsifier comprises a surfactant.

13. A process as defined in claim 1, wherein the removing step comprises drying said portion of said fibrous mass.

14. A process as defined in claim 1, wherein the removing step comprises heating said portion of said fibrous mass to a temperature in excess of approximately 100° C.

15. A process as defined in claim 1, and further comprising the step of comminuting part of said fibrous mass prior to the contacting step.

* * * * *